US010264519B2

(12) United States Patent
Ponnuswamy

(10) Patent No.: US 10,264,519 B2
(45) Date of Patent: Apr. 16, 2019

(54) ESTIMATING SIGNAL STRENGTH AT A TARGET WIRELESS DEVICE

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

(*) Notice: Subject to any disclaimer, the term of this patent is extended or adjusted under 35 U.S.C. 154(b) by 273 days.

(21) Appl. No.: 14/788,310

(22) Filed: Jun. 30, 2015

(65) Prior Publication Data
US 2017/0006489 A1 Jan. 5, 2017

(51) Int. Cl.
H04W 48/16 (2009.01)
H04W 48/20 (2009.01)
H04W 84/12 (2009.01)

(52) U.S. Cl.
CPC .......... H04W 48/20 (2013.01); H04W 48/16 (2013.01); H04W 84/12 (2013.01)

(58) Field of Classification Search
CPC .............. H04B 17/30; G08B 21/0247; G08B 21/0275; G06K 7/0008; G06K 7/10079; H04N 21/4126; H04W 16/14; H04W 24/00; H04W 24/08; H04W 28/10; H04W 28/048; H04W 36/08; H04W 36/22; H04W 36/30; H04W 48/08; H04W 48/20; H04W 48/16; H04W 52/16; H04W 52/18; H04W 52/24; H04W 52/34; H04W 52/36; H04W 52/283; H04W 52/322; H04W 52/346; H04W 76/046; H04W 84/12
See application file for complete search history.

(56) References Cited

U.S. PATENT DOCUMENTS

| 7,084,809 B2 | 8/2006 | Hockley, Jr. et al. |
| 7,239,277 B2 | 7/2007 | Fullerton et al. |
| 9,042,324 B2 | 5/2015 | Zhang et al. |
| 10,021,529 B2 | 7/2018 | Narasimhan et al. |
| 2002/0075825 A1* | 6/2002 | Hills ............... H04W 16/18 370/329 |
| 2003/0148765 A1 | 8/2003 | Ma et al. |
| 2005/0246334 A1 | 11/2005 | Tao et al. |
| 2006/0068731 A1 | 3/2006 | Seier |
| 2007/0207816 A1 | 9/2007 | Spain, Jr. |
| 2010/0284345 A1 | 11/2010 | Rudrapatna et al. |
| 2011/0183626 A1 | 7/2011 | Das et al. |
| 2011/0183683 A1* | 7/2011 | Das ............... H04W 60/00 455/456.1 |
| 2011/0237259 A1 | 9/2011 | Dimou et al. |
| 2012/0040696 A1 | 2/2012 | Siomina et al. |
| 2014/0357294 A1 | 12/2014 | Rajakarunanayake et al. |
| 2015/0094085 A1 | 4/2015 | Agrawal et al. |

(Continued)

Primary Examiner — Marsha D Banks Harold
Assistant Examiner — Dharmesh J Patel
(74) Attorney, Agent, or Firm — Invoke

(57) ABSTRACT

Operations include estimating a signal strength of a wireless signal as if received by a target wireless device. One or more relationships between detected signal strength values, measured channel utilization values, and/or actual channel utilization values are determined. The estimation is made based on applying detected signal strength values received at other wireless devices, measured channel utilization values at other wireless devices, and/or actual channel utilization values at other wireless devices to the relationships.

21 Claims, 6 Drawing Sheets

(56) References Cited

U.S. PATENT DOCUMENTS

2015/0312724 A1* 10/2015 Singh ................... H04W 4/04
                                                            455/456.1
2016/0037424 A1* 2/2016 Xie ..................... H04W 48/16
                                                            370/329
2016/0119838 A1* 4/2016 Kapoor ................ H04W 48/20
                                                            370/332

* cited by examiner

ESTIMATING SIGNAL STRENGTH AT A TARGET WIRELESS DEVICE

INCORPORATION BY REFERENCE; RELATED APPLICATION

This application is related to U.S. Non-Provisional patent application Ser. No. 14/755,583, filed Jun. 30, 2015, and U.S. Non-Provisional patent application Ser. No. 14/788,397, filed Jun. 30, 2015, all of which are hereby incorporated by reference.

TECHNICAL FIELD

The present disclosure relates to estimating signal strength. In particular, the present disclosure relates to estimating signal strength of a wireless signal as if received by a target wireless device.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a wireless access point (WAP) that communicates wirelessly with devices using Wi-Fi, Bluetooth or related standards and that communicates with a wired network. An access point performs periodic scanning on one or more channels in order to obtain information about a wireless environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
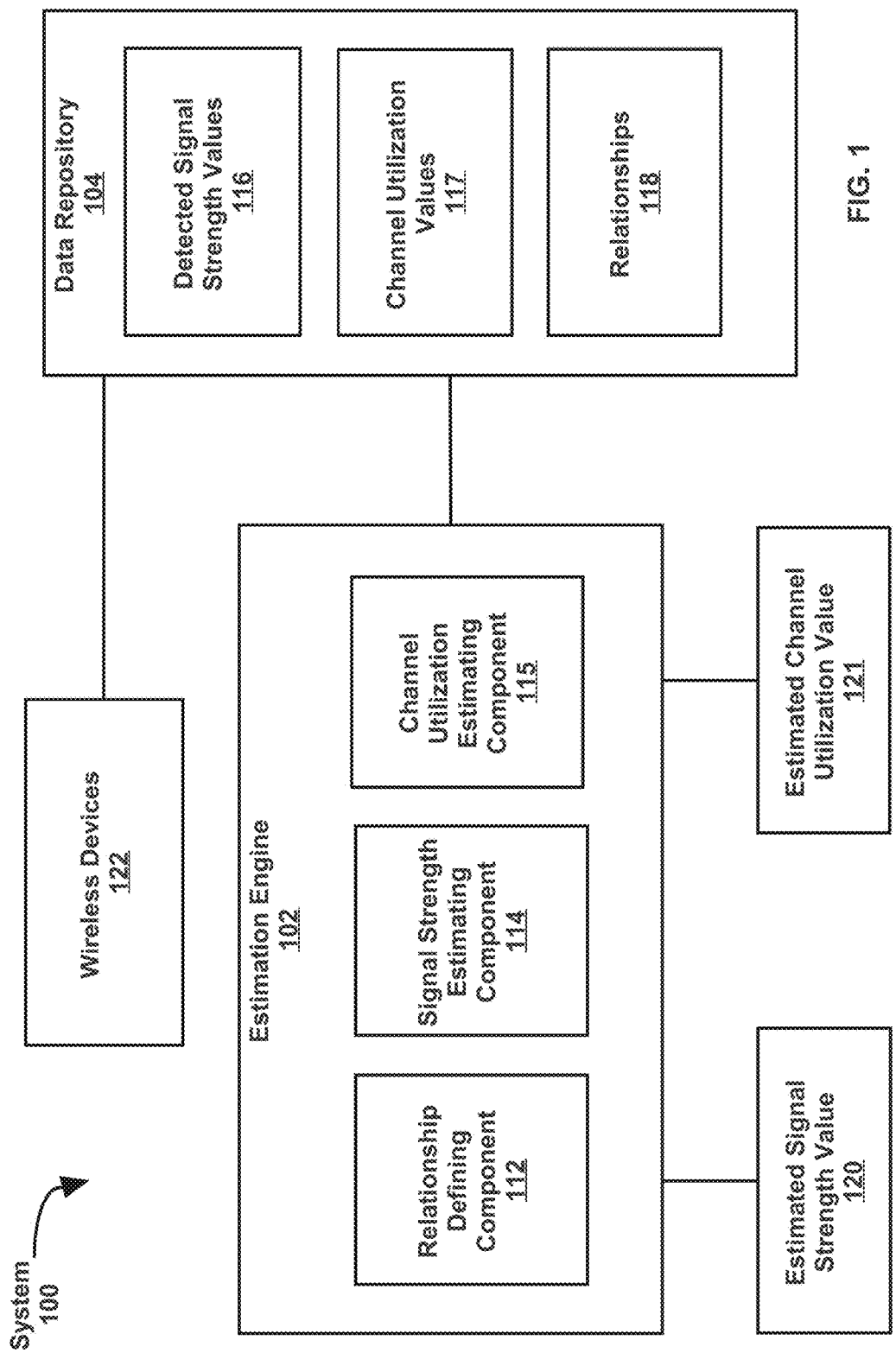
FIG. 1 shows a block diagram example of a system in accordance with one or more embodiments.

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

A. General Overview

In one or more embodiments, an estimated signal strength of a first wireless signal as if received at a target wireless device is determined based on a detected signal strength of a second wireless signal received at a first wireless device. In an example, the first wireless signal is the same as the second wireless signal. In another example, the first wireless signal is different from the second wireless signal, and the estimation is made as if the first wireless signal is sent from the same transmitting device that sent the second wireless signal.

In one or more embodiments, an estimated signal strength of a wireless signal as if received at a target wireless device is determined based on a previously determined relationship between a first signal strength of a first wireless signal received at a first wireless device and a second signal strength of a second wireless signal received at the target wireless device. In one example, the first wireless signal and the second wireless signal are the same. In another example, the first wireless signal and the second wireless signal are different but are transmitted and/or received within a time window.

In an embodiment, an estimation of a signal strength of a wireless signal sent from a transmitting device that is known to be stationary, such as an access point, is made. The estimated signal strength is determined based on at least one detected signal strength received at least one wireless device. In another embodiment, an estimation of a signal strength of a wireless signal sent from a transmitting device that is not known to be stationary, such as a client device, is made. The estimated signal strength is determined based on at least two detected signal strengths received at least two wireless devices.

In one or more embodiments, an estimated channel utilization, for a target wireless device, is determined based on a first measured channel utilization, for a first wireless device. The estimation is further determined based on a previously determined relationship between a second measured channel utilization, for the first wireless device, and a third measured channel utilization, for the target wireless device. The estimated channel utilization, the first measured channel utilization, the second measured channel utilization, and the third measured channel utilization correspond to a set of wireless signals transmitted and/or received by a second wireless device on a particular channel.

In one or more embodiments, an estimated channel utilization, for a target wireless device, is determined based on a first actual channel utilization, for a first wireless device. The estimation is further determined based on a previously determined relationship between a second actual channel utilization, for the first wireless device, and a first measured channel utilization, for the target wireless device. The estimated channel utilization, the first actual channel utilization, the second actual channel utilization, and the first measured channel utilization correspond to a set of wireless signals transmitted and/or received by the first wireless device on a particular channel.

In one or more embodiments, one or more wireless devices are configured based on an estimated signal strength of a wireless signal and/or an estimated channel utilization, as if received at a target wireless device. The target wireless device, an access point, and/or a client device may be configured.

B. Architectural Overview

FIG. 1 illustrates an example of a system in accordance with one or more embodiments. As illustrated in FIG. 1, system 100 includes an estimation engine 102, a data repository 104, and one or more wireless devices 122. In one or more embodiments, system 100 may include more or less components, than the components illustrated in FIG. 1. The components illustrated in FIG. 1 may be local to or remote from each other. The components illustrated in FIG. 1 may be implemented in software and/or hardware and may be distributed over one or more applications and/or machines. In an embodiment, components within system 100 (for example, estimation engine 102 and data repository 104) are implemented on a same device. Operations described with respect to one component may instead be performed by another component.

In one or more embodiments, wireless devices 122 includes digital devices including functionality to transmit and/or receive information from each other without being connected by an electrical conductor, such as an IEEE 802.11 wireless interface. The term "digital device" generally refers to any hardware device that includes a processor. A digital device may refer to a physical controller device or a hardware device executing a virtual controller.

In an embodiment, information is transmitted and/or received by a wireless device 122 using wireless signals within a particular range of frequencies, which is referred to herein as a channel. In an example, a wireless device 122 includes functionality to operate in multiple channels. In an example, a wireless device 122 is configured to operate in at most one of a plurality of channels at any given time. For example, the IEEE 802.11 2.4 GHz band is divided into fourteen (14) channels.

Examples of wireless devices include a computer, a tablet, a laptop, a desktop, a netbook, a set-top box, a video gaming console, a printer, a mobile handset, a smartphone, a personal digital assistant "PDA", a wireless receiver and/or transmitter, a base station, an access point, and/or a client device.

In an embodiment, wireless devices 122 includes one or more access points. An access point is a wireless device that is configured to provide a network service. In an example, an access point provides a Wireless Local Area Network (WLAN) using wireless signals based on IEEE 802.11 standards.

In an example, an access point is configured to operate on a particular channel, referred to herein as a current operating channel or a home operating channel. Other wireless devices operating in the current operating channel may connect to the access point to connect to a network service.

In an example, an access point is configured to scan a wireless environment using one or more channels. An access point may be configured to perform scanning in a current operating channel and/or switch to another channel for performing a scanning operation. During scanning of a particular channel (other than the current operating channel), an access point is not able to receive wireless signals in other channels. An access point operating in a first channel needs to go off-channel in order to perform a scan of a second channel. An access point may be configured to perform periodic scanning and to cycle through multiple channels during one scanning operation.

In an embodiment, wireless devices 122 includes one or more client devices. A client device is a wireless device that is configured to receive a network service. A client devices may be configured to receive voice data streams, video data streams, or any other type of data.

In an embodiment, wireless devices 122 includes a target wireless device, a detecting wireless device, and a transmitting device. As referred to herein, a transmitting device is a wireless device that transmits a wireless signal, for which a signal strength is to be estimated. A detecting wireless device is a wireless device that detects a signal strength of the wireless signal. A target wireless device is a wireless device for which a signal strength of the wireless signal is to be estimated, or a wireless device for which a channel utilization is to be estimated. An example set of operations for estimating a signal strength of a wireless signal as if received at a target wireless device based on a signal strength of a wireless signal received at a detecting wireless device is described below in FIG. 2A. An example set of operations for estimating a channel utilization for a target wireless device based on a measured channel utilization for a detecting wireless device is described below in FIG. 2B.

In an example, a detecting wireless device detects a signal strength of a wireless signal in its current operating channel. One or more signal strengths detected as a matter of normal operation of the detecting wireless device are used to perform an estimation of a signal strength as if received by a target wireless device.

In an example, a detecting wireless device detects a signal strength of a wireless signal during a scan. The detecting wireless device is selected and configured to scan a wireless environment based on a finding that existing information on the wireless environment is insufficient. The detecting wireless device may be selected based on device attributes of wireless devices in the wireless environment. The scanning configurations of the detecting wireless device may be selected based on the additional wireless environment information desired to be obtained. Some examples of cooperative scanning of wireless devices is described in U.S. patent application Ser. No. 14/755,583 filed Jun. 30, 2015, titled "Cooperative Scanning of Wireless Devices," which is hereby incorporated by reference.

In one or more embodiments, data repository 104 is any type of storage unit and/or device (e.g., a file system, database, collection of tables, or any other storage mechanism) for storing data. Further, the data repository 104 may include multiple different storage units and/or devices. The multiple different storage units and/or devices may or may not be of the same type or located at the same physical site. Further, data repository 104 may be or may execute on the same computing system as estimation engine 102 or any of wireless devices 122. Alternatively or additionally, data repository 104 may be on a separate computing system than estimation engine 102. Data repository 104 may be connected to estimation engine 102 and/or wireless devices 122 via a direct connection or via a network. One or more detected signal strength values 116, one or more channel utilization values 117, and one or more relationships 118 may be implemented across any of the devices within System 100, however, are illustrated within data repository 104 for purposes of clarity/explanation.

In one or more embodiments, detected signal strength values 116 are measurements of a power at which a wireless signal is received at a wireless device 122. Detected signal strength values 116 may be measured in decibels (dB). For example, one of detected signal strength values 116 is a signal strength of a wireless signal received at an access point during a scanning operation of the access point.

In an embodiment, detected signal strength values 116 include measurement data over multiple time windows, multiple wireless devices 122, and/or multiple channels. In an example, detected signal strength values 116 for Wi-Fi signals are presented as decibels (dB). In another example, detected signal strength values 116 for non-Wi-Fi signals (e.g., interference) is represented using time-stamped Fast Fourier Transforms (FFTs). Detected signal strength values 116 include signal strengths corresponding to (a) a same wireless signal received at multiple wireless devices 122, (b) different wireless signals sent by a same transmitting device and received at a wireless device 122, and/or (c) wireless signals sent by different transmitting devices and received at wireless device 122. In an example, a detected signal strength value 116 of a wireless signal is stored with (a) an identifier of the wireless device 122 that received the wireless signal, (b) a time at which the wireless signal was received by the wireless device 122, and/or (c) a channel in which the wireless signal was received. In an example, a detected signal strength value 116 of a wireless signal is stored with an identifier of the transmitting device and/or an indicator indicating whether the transmitting device is stationary.

In one or more embodiments, a channel utilization value 117 refers to a percentage of time in which a particular channel is being used. The particular channel may be used by wireless signals transmitted and/or received by one or more wireless devices. A channel utilization value may correspond to a set of one or more wireless signals being transmitted and/or received, on a particular channel, by a first wireless device. This channel utilization value refers to a percentage of time in which the particular channel is being used by the set of wireless signals transmitted and/or received by the first wireless device. The first wireless device may be an access point, which transmits and receives wireless signals to and from one or more client devices connected to the access point. The access point and the connected client devices may be referred to herein as a basic service set (BSS). Channel utilization values 117 may include actual channel utilization values and/or measured channel utilization values.

In an embodiment, an actual channel utilization value, for a first wireless device, refers to a percentage of time in which a set of wireless signals is being transmitted and/or received, on a particular channel, by the first wireless device. In an example, the set of wireless signals corresponds to a BSS, and the first wireless device is an access point associated with the BSS.

In an embodiment, a measured channel utilization, for a second wireless device, refers to a percentage of time in which a subset of a set of wireless signals are received by the second wireless device. The set of wireless signals are being transmitted and/or received, on a particular channel, by a first wireless device. In an example, the set of wireless signals correspond to a BSS. The first wireless device is an access point associated with the BSS. The second wireless device is not associated with the BSS.

In one or more embodiments, a relationship 118 is a relationship between signal strength values of signals received by two different devices. In one example, a first relationship R1 indicates that wireless signals from a first stationary transmitting device A (at a first location) as received by a first detecting device Y are typically 20 dB more than wireless signals received by a second detecting device Z. A second relationship R2 indicates that wireless signals from a second stationary device B (at a second location) as received by the first detecting device A are typically 10 dB less than wireless signals received by the second detecting device Z. The first relationship and second relationship are summarized below in Table 1:

TABLE 1

| Relationship | Stationary Transmitting Device | Device Y (Signal Strength) | Device Z (Signal Strength) |
| --- | --- | --- | --- |
| R1 | A | V1 | V1 − 20 dB |
| R2 | B | V2 | V2 + 10 dB |

The relationship 118 may be a mathematical relationship and/or a logical relationship based on a comparison of two or more detected signal strength values 116 corresponding to wireless signals previously received at the wireless devices 122. A relationship 118 may be based on a comparison of signal strength values of (a) received beacons that were transmitted by access points, (b) received IEEE 802.11 frames transmitted by a wireless device 122, or (c) detected noise signals, and/or any other wireless signals not described herein.

In an example, a relationship 118 utilizes a difference, averaging, or other mathematical functions. For example, a relationship 118 is determined based on a difference between two detected signal strength values 116 corresponding to wireless signals received by two different devices. As another example, a first average (mean, mode, and/or median) of detected signal strength values of a first wireless device is computed. A second average (mean, model, and/or median) of detected signal strength values of a second wireless device is computed. A relationship 118 is defined based on a difference between the first average and the second average. As another example, a relationship 118 is determined between a first signal strength value S1 and a second signal strength value S2, such that the first signal strength value is determined as a function of the second strength value, or S1=f(S2). Examples of mathematical functions include linear and/or exponential functions.

In an example, a relationship 118 is determined based on detected signal strength values 116 of a same wireless signal received at multiple wireless devices 122. In another example, a relationship 118 is determined based on detected signal strength values 116 of different wireless signals sent by a same transmitting device and received at multiple wireless devices 122 within a predetermined time window, which may be defined manually or by a system.

In an example, a relationship 118 is stored with one or more identifiers of the multiple wireless devices associated with the relationship 118. In an example, a relationship 118 is stored with an identifier of a transmitting device associated with the relationship 118. Relationships 118 may be stored as a table, an array, an index, a linked list, or any other data structure.

In an embodiment, relationship 118 defines a relationship between signal strength values corresponding to wireless signals received at three or more wireless devices 122 from a particular location. The relationship is applicable to wireless signals transmitted from the particular location by the same device or by different devices. In an example, relationship 118 indicates that a signal strength x of signals received at a first access point are determined as a function of signal strength y of signals received at a second access point and signal strength z received at a third access point. Specifically, x can be computed as a function of y (e.g., x=y+5) or as a function of z (e.g., x=z−10), whenever z and y meet the relationship definition (e.g., z=y+15).

In one embodiment, multiple relationships are determined for a set of devices. Each relationship for any set of devices corresponds to a particular location or a particular transmitting device. A relationship for a set of devices that corresponds to a particular location is based on wireless signals received from that particular location. A relationship for a set of devices may correspond to a particular transmitting device if (a) the wireless signals used to determine the relationship are received from the particular transmitting device and (b) the particular transmitting device is stationary.

In an example, each of a set of relationships are determined based on a set of signals received from a same location (from a same device or from multiple devices at that same location). The set of relationships for devices X, Y, and Z are illustrated below in Table 2.

TABLE 2

| Relationship | Location | Device X (Signal Strength) | Device Y (Signal Strength) | Device Z (Signal Strength) |
| --- | --- | --- | --- | --- |
| R1 | L1 | X1 | X1 + 10 dB | X1 − 20 dB |
| R2 | L2 | X2 | X2 − 15 dB | X2 + 30 dB |
| R3 | L3 | X3 | X3 + 20 dB | X3 − 20 dB |

Relationship R1 is based on one or more wireless signals detected by device X, device Y, and device Z that were transmitted from location L1 by a same transmitting device or by multiple transmitting devices. Relationship R2 is based on one or more wireless signals detected by device X, device Y, and device Z that were transmitted from location L2 by a same transmitting device or by multiple transmitting devices. Relationship R3 is based on one or more wireless signals detected by device X, device Y, and device Z that were transmitted from location L3 by a same transmitting device or by multiple transmitting devices.

In one or more embodiments, relationships 118 include relationships between actual channel utilization values, measured channel utilization values, and/or signal strength values. A relationship may be between a first measured channel utilization value and a second measured channel utilization value. Alternatively, a relationship may be between a measured channel utilization value and an actual channel utilization. Alternatively, a relationship may be between a measured channel utilization value and a signal strength of a wireless signal.

In one or more embodiments, relationships 118 may be associated with additional information, such as, a Modulation and Coding Scheme (MCS) value, an actual channel utilization value, and/or a signal strength of a wireless signal received at a wireless device. Different relationships corresponding to a same group of wireless devices may exist, based on different MCS values, actual channel utilization values, and/or signal strengths. In an example, given a first MCS value, a first relationship applies to a first wireless device and a second wireless device. Given a second MCS value, a second relationships applies to the first wireless and the second wireless device. In another example, given a first actual channel utilization value corresponding to a BSS, a first relationship indicates a first difference between a first measured channel utilization corresponding to the BSS and a second measured channel utilization corresponding to the BSS. Given a second actual channel utilization, a second relationship indicates a second difference between a third measured channel utilization corresponding to the BSS and a fourth measured channel utilization corresponding to the BSS.

In one or more embodiments, an estimated signal strength value 120 is a signal strength estimated for a wireless signal as if received by a target wireless device. Estimated signal strength value 120 is determined based on one or more detected signal strength values 116, one or more channel utilization values 117, and one or more relationships 118. In an example, estimated signal strength value 116 for a wireless signal in a particular channel is determined based on a detected signal strength value 116 corresponding to the same particular channel and a relationship 118 corresponding to the same particular channel. In an example, estimated signal strength value 120 corresponding to a target wireless device is made without any detected signal strength values 116 received at the target wireless device within a current time period.

In an example, estimated signal strength value 120 is a signal strength estimated for a particular wireless signal based at least on a detected signal strength value 116 of the particular wireless signal. In another example, an estimated signal strength value 120 is a signal strength estimated for a particular wireless signal based at least on a detected signal strength value 116 of another wireless signal transmitted by a particular transmitting device, as if the particular wireless signal is transmitted by the same particular transmitting device.

In one or more embodiments, estimated channel utilization value 121 is a channel utilization estimated for a target wireless device, corresponding to a set of wireless signal that are being transmitted and/or received by another wireless device. Estimated channel utilization value 121 is determined based on one or more detected signal strength values 116, one or more channel utilization values 117, and one or more relationships 118. In an example, estimated channel utilization value 121, for a target wireless device, corresponding to a set of wireless signals, may be determined even if the target wireless device is unable to decode the set of wireless signals. In another example, estimated channel utilization value 117, for a target wireless device, corresponding to a set of wireless signals in a particular channel, may be determined even if the target wireless device is not operating in the particular channel.

In one or more embodiments, estimation engine 102 includes one or more digital devices configured to perform operations described herein for estimating a signal strength. In an example, estimation engine 102 is the same as or implemented on a same device as one or more of wireless devices 122. In another example, estimation engine 102 is implemented on a separate device from wireless devices 122, such as at a controller and/or a server located in a cloud computing environment. Estimation engine 102 includes a relationship defining component 112, a signal strength estimating component 114, and a channel utilization estimating component 115. Relationship defining component 112, signal strength estimating component 114, and channel utilization component 115 may be implemented on a same or different modules, applications, devices, and/or machines.

In one or more embodiments, relationship defining component 112 includes functionality for determining relationships 118 based on detected signal strength values 116. In an example, relationship defining component 112 is configured to identify detected signal strength values 116 corresponding to one or more wireless signals received within a time window, compare the identified detected signal strength values 116, and store a result of the comparison as a relationship 118.

In one or more embodiments, signal strength estimating component 114 includes functionality for estimating a signal strength based on at least one of detected signal strength values 116 and at least one of relationships 118. In an example, signal strength estimating component 114 is configured to identify a detected signal strength value 116 corresponding to a wireless device 122, apply a relationship 118 to this detected signal strength value 116, and determine estimated signal strength value 120 corresponding to another wireless device 122.

In one or more embodiments, channel utilization component 115 includes functionality for estimating a channel utilization based on a relationship 118 and at least one of a measured channel utilization value and an actual channel utilization value. In an example, channel utilization estimating component 115 is configured to identify a channel utilization value 117 corresponding to a set of wireless signals being transmitted and/or received by a wireless device 122, apply a relationship 118 to this channel utilization value 117, and determine estimated channel utilization value 121, for a target wireless device.

Figure 2A:
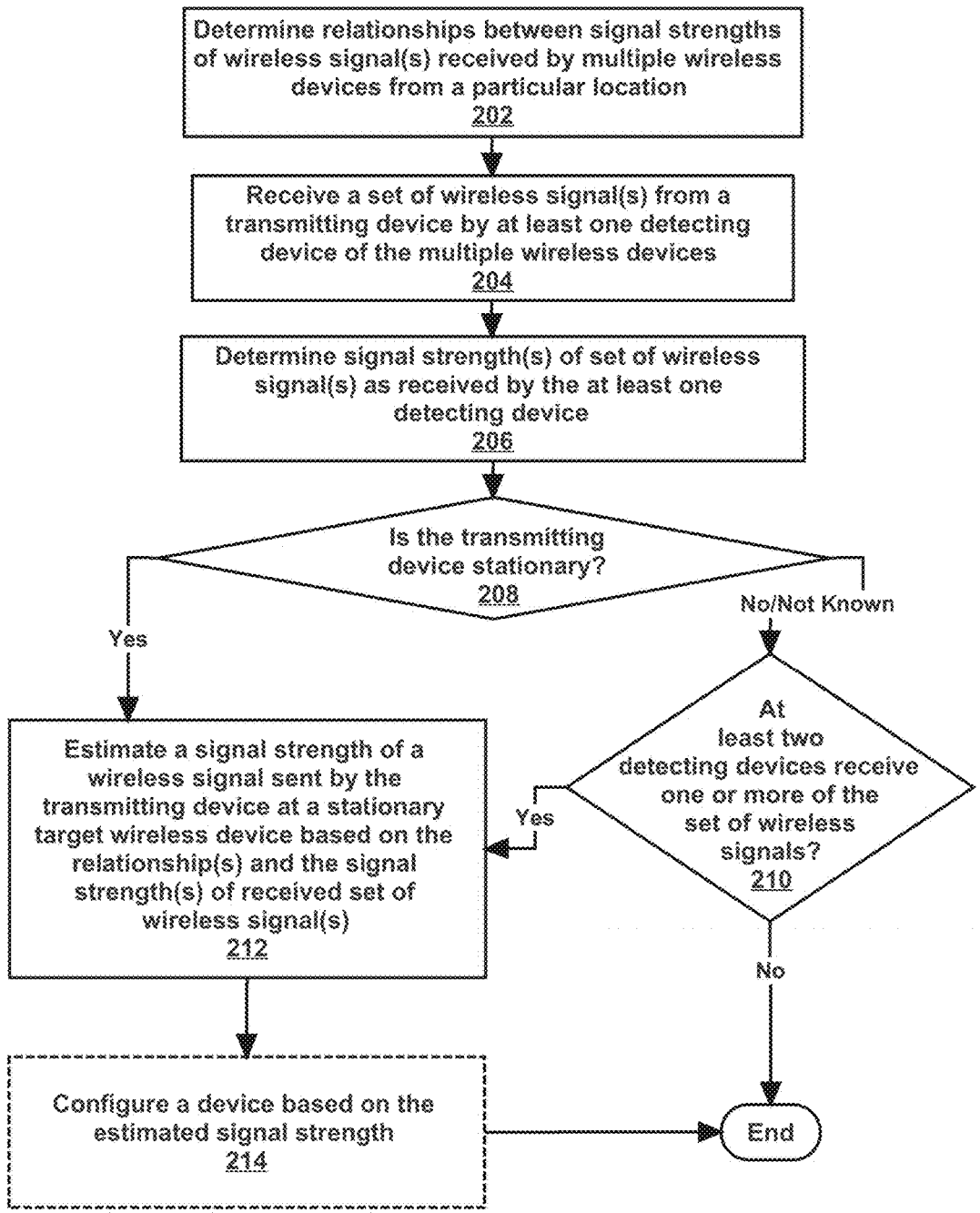
FIG. 2A shows an example set of operations for estimating signal strength in accordance with one or more embodiments.

C. Determine Estimated Signal Strength of a Wireless Signal at a Target Wireless Device FIG. 2A illustrates an example set of operations for estimating signal strength in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

Initially, one or more relationships between multiple wireless devices are determined based on signal strengths of wireless signals received at the multiple wireless devices in accordance with one or more embodiments (Operation 202).

In an example, a relationship between a first wireless device and a second wireless device is determined based on a same set of wireless signals transmitted from a same location (by a same transmitting device or different transmitting devices). The relationship is determined based on a wireless signal(s) transmitted by a third device while at a particular location and received by both the first wireless device and the second wireless device. A difference between the first signal strength and the second signal strength is computed. The difference is stored as a relationship corresponding to the first wireless device, the second wireless device, and the third device (if the third device is stationary). Alternatively, the difference is stored as a relationship corresponding to the first wireless device, the second wireless device, and the particular location as a transmitting location. When the relationship corresponds to a transmitting location, the third wireless device may be stationary or mobile.

In another example, a relationship between a first wireless device and a second wireless device is determined based on different sets of wireless signals transmitted from a same location (by a same transmitting device or different transmitting devices). A first set of one or more wireless signals is transmitted from a particular location and received by the first wireless device at a first signal strength. A second set of one or more wireless signals is transmitted from the particular location and received by the second wireless device at a second signal strength. A difference between the first signal strength and the second signal strength is computed. The difference is stored as a relationship corresponding to the first wireless device, the second wireless device, and the location from which the first set of wireless signals and the second set of wireless signals were transmitted.

In the above example, a time window requirement may be implemented. To implement a time window requirement, the relationship is determined based on the first set of wireless signals and the second set of wireless signals if both sets of wireless signals are transmitted and/or received within a same time window. The duration of the time window may be determined manually or by a system. The duration of the time window may be determined based on whether a wireless signal or corresponding data changes quickly or slowly over time, and may be different for different types of wireless signals or data. In one example, a time window is determined based on whether a transmitting device is stationary or mobile. The time window selected for stationary transmitting devices is longer than a time window for selected for mobile transmitting devices.

In another example, a relationship between a first wireless device and a second wireless device is determined based on average signal strengths. A first average is determined for a first set of signal strengths of a first set of wireless signals received at the first wireless device from a third device. A second average is determined for a second set of signal strengths of a second set of wireless signals received at the second wireless device from the third device. A difference between the first average and the second average is stored as a relationship between signal strengths of wireless signals received by the first device and the second device from the third device.

In an example, a relationship is determined based on wireless signals transmitted from a particular location and detected by three or more devices. A particular client device transmits a wireless signal that is detected by three different devices at three corresponding signal strength values. A first access point detects the wireless signal at a first signal strength value x. A second access point detects the wireless signal at a second signal strength value y. A third access point detects the wireless signal at a third signal strength value z. The combination of the three detected signal strength values is used to determine a relationship. The relationship indicates that the first signal strength value x is 10 dB more than the second signal strength value y (x=y+10). The relationship further indicates that the first signal strength x is 5 dB less than the third signal strength z (x=z−5). Accordingly, the third signal strength value z is 15 dB more than the second signal strength value y (z=y+15). The relationship 118 is defined as a function of three sub-relationships. X can be determined using z=y+10 or x=z−5 as long as z=y+15. A set of relationships may be defined for a set of devices as indicated in the illustrated example above with reference to Table 1.

In an example, a relationship corresponding to a first wireless device and a second wireless device is stored with additional information related to the first wireless device, the second wireless device, the wireless signal(s) detected, the transmitting device(s) of the wireless signal(s), and/or a location of the transmitting device(s). In an example, a relationship corresponding to a first wireless device and a second wireless device is stored with identifiers of the first wireless device and the second wireless device, such as a MAC address. In another example, a relationship is stored with the channel used by the first wireless device and/or the second wireless device to receive a wireless signal underlying with the relationship.

In another example, a relationship is stored with an identifier of a transmitting device of a wireless signal underlying the relationship. The identifier of the transmitting device, such as a MAC address, may be included in a beacon transmitted from an access point, a request to connect transmitted from a client device, or another wireless signal that is encoded with data.

In an embodiment, at least one of the wireless devices (associated with a relationship) receives a set of one or more wireless signals from a transmitting device (Operation 204). The at least one device that receives the set of wireless signals is referred to herein as a "detecting wireless device" or a "detecting device." The detecting device may be a device operating as a monitor/scanner by switching through channels. The detecting device may be a device operating in a home channel for serving connected clients.

In an embodiment, the signal strength(s) of the received set of wireless signal(s) is determined (Operation 206). In an example, a single detecting device receives the set of wireless signals and determines a signal strength of the received set of wireless signals. In another example, a wireless signal transmitted by a particular device is received at multiple other devices with varying levels of signal strength. The signal strength is determined for the wireless signal as received by each of the multiple other devices. In another example, a particular device, while at a same location, transmits multiple wireless signals that are received at multiple other devices, respectively. The signal strength for each wireless signal, as received by a respective device, is determined.

In an embodiment, an inquiry is made as to whether the transmitting device is stationary (Operation 208). A stationary device, as referred to herein, is a device that is typically located at the same location (e.g., an access point). A mobile device, as referred to herein, is a device that is not typically located at the same location. Examples of mobile devices include, but are not limited to, a cell phone, a laptop, a watch, and a tablet.

In an embodiment, a stationary or mobile status of a transmitting device is indicated in characteristics associated with the transmitting device. The received set of wireless signals includes data identifying a transmitting device with known characteristics. The known characteristics of the transmitting device may indicate whether the transmitting device is stationary or mobile. In one example, a wireless signal, received by a detecting device, is a beacon. The beacon indicates that the transmitting device is a particular access point, which is known to be stationary. As another example, a wireless signal includes an identifier of a transmitting device, such as a MAC address. A lookup table maps device identifiers to whether devices are stationary or not based on historical data. The lookup table is accessed to determine the particular device identifier corresponds to a mobile device (e.g., a cellular phone).

In an embodiment, a stationary or mobile status of a transmitting device is unknown. For example, the set of received wireless signals corresponds to undecipherable noise. Accordingly, an identity of the transmitting device is not known. As a result, the stationary or mobile status of the transmitting device cannot be determined.

If the transmitting device is not stationary (i.e., mobile), or if the stationary/mobile status of the transmitting device is not known, at least two detecting devices are needed for detecting one or more of the set of wireless signals (Operation 210). If the transmitting device is stationary, one or more detecting devices may be used for detecting one or more of the set of wireless signals.

In an embodiment, a signal strength of a wireless signal is estimated as if received by a target device (Operation 212). The estimated signal strength is based on (1) the strength(s) of the set of wireless signals received by the detecting device(s), and (2) a relationship between signal strengths of wireless signals previously received by the detecting device(s) and the target device.

A first time period corresponds to a time period associated with the transmission/receipt of the wireless signals used for determining the relationship. A second time period corresponds to a time period associated with transmission/receipt of wireless signals used for estimating the signal strength of a wireless signal as if received by the target device. The target device and the detecting device(s) are assumed to be at a same location at least during the first time period and the second time period.

C.1 Estimate Signal Strength of a Wireless Signal at a Target Wireless Device Using Two or More Detecting Devices In one embodiment, signal strength of a set of one or more wireless signals, as if received at a target wireless device, is estimated using two or more detecting devices. The set of one or more wireless signals is received by two or more detecting devices. A first signal strength corresponds to wireless signal(s) received by a first detecting device. A second signal strength corresponds to wireless signal(s) received by a second detecting device. The first signal strength is compared to the second signal strength to determine a difference value. The difference value is compared to a set of relationships to select an applicable relationship from the set of relationships for estimating the signal strength for the target device.

In one example, device X is a target wireless device, device Y is a first detecting device, and device Z is a second detecting device. A set of relationships have been determined between devices X, Y, and Z based on wireless signals previously received by devices X, Y, and Z. Table 3 below illustrates the previously determined set of relationships:

TABLE 3

| Relation-ship | Device X (Signal Strength) | Device Y (Signal Strength) | Device Z (Signal Strength) |
|---|---|---|---|
| R1 | X1 | Y1 = X1 + 10 dB | Z1 = X1 − 20 dB = Y1 − 30 dB |
| R2 | X2 | Y2 = X2 − 15 dB | Z2 = X2 + 30 dB = Y2 + 45 dB |
| R3 | X3 | Y3 = X3 + 20 dB | Z3 = X3 − 20 dB = Y3 − 40 dB |

In each relationship illustrated in Table 3, signal strengths for wireless signals received by any of devices X, Y, and Z are indicated relative to signal strengths for wireless signals received by the others of devices X, Y, and Z from the same transmitting location.

The first relationship R1 corresponds to signal strengths of wireless signals received from a first location by devices X, Y, and Z. Specifically, device Y received wireless signals from the particular location at a signal strength 10 dB higher than a signal strength of wireless signals received by device X from the particular location (Y1=X1+10 dB). Furthermore, device Z received wireless signals from the particular location at a signal strength 20 dB lower than a signal strength of wireless signals received by device X from the particular location (Z1=X1−20 dB). Lastly, device Z received wireless signals from the particular location at a signal strength 30 dB lower than a signal strength of wireless signals received by device Y from the particular location (Z1=Y1−30 dB).

The second relationship R2 corresponds to signal strengths of wireless signals received from a second location by devices X, Y, and Z. Specifically, device Y received wireless signals from the particular location at a signal strength 15 dB lower than a signal strength of wireless signals received by device X from the particular location (Y2=X2−15 dB). Furthermore, device Z received wireless signals from the particular location at a signal strength 30 dB higher than a signal strength of wireless signals received by device X from the particular location (Z2=X2+30 dB). Lastly, device Z received wireless signals from the particular location at a signal strength 45 dB higher than a signal strength of wireless signals received by device Y from the particular location (Z2=Y2+45 dB).

The third relationship R3 corresponds to signal strengths of wireless signals received from a third location by devices X, Y, and Z. Specifically, device Y received wireless signals from the particular location at a signal strength 20 dB higher than a signal strength of wireless signals received by device X from the particular location (Y3=X3+20 dB). Furthermore, device Z received wireless signals from the particular location at a signal strength 20 dB lower than a signal strength of wireless signals received by device X from the particular location (Z3=X3−20 dB). Lastly, device Z received wireless signals from the particular location at a signal strength 40 dB lower than a signal strength of wireless signals received by device Y from the particular location (Z3=Y3−40 dB).

Subsequent to determining the set of relationships, device Y detects a wireless signal from a particular device with a signal strength of −30 dB. Furthermore, device Z detects a wireless signal from the same particular device, at approximately the same time, with a signal strength of −60 dB. Based on the signal strength of −30 dB of a received wireless signal detected by device Y and the signal strength of −60 dB of a received wireless signal detected by device Z, the signal strength of a wireless signal, as if received by target device X is to be estimated.

A determination is made that device Y has received a wireless signal with a signal strength that is 30 dB more than a signal strength of a wireless signal received by device Z. This difference of 30 dB is used to identify an applicable relationship of the set of previously determined relationships. Specifically, a relationship is to be identified where device Y has received a wireless signal(s) with a signal strength that is 30 dB more than a signal strength of a wireless signal received by device Z. A review of the set of relationships associated with devices X, Y, Z (illustrated in Table 3 above) reveals that relationship R1 is the applicable relationship (R1: Z1=Y1−30 dB). Once R1 is identified as the applicable relationship, the estimated signal strength for wireless signal(s), as if received by device X, may be computed using R1. The estimated signal strength may be computed as a function of the signal strength of the wireless signal(s) detected by device Y (Y1−10 dB=X1 or −30 dB−10 dB=−40 dB). The estimated signal strength may also be computed as a function of the signal strength of wireless signal(s) detected by device Z (Z1+20 dB=X1 or −60 dB+20 dB=−40 dB). Accordingly, the estimated signal strength of a wireless signal, as if received by device X, is determined to be −40 dB.

In the above example, the applicable relationship was identified based on a difference of 30 dB between the signal strengths of the wireless signals received by the two detecting devices. However, the relationship may be defined within a margin of error. For example, 30 dB+/−2 dB may be used to select a relationship with a difference of signal strength of wireless signals received by device Y and device Z ranging from 28 dB to 32 dB.

Although two detecting devices were included in the example above, additional detecting devices may be used to estimate the signal strength of a wireless signal, as if received by device X.

C.2 Estimate Signal Strength of a Wireless Signal at a Target Wireless Device Using One or More Detecting Devices In one embodiment, signal strength of a set of one or more wireless signals, as if received at a target wireless device, is estimated using one or more detecting devices. The signal strength is estimated using one of a set of relationships associated with the target device, the one or more detecting devices, and at least one of: an identifier for the transmitting device or a location for the transmitting device.

In an example, device J is a target wireless device and device K is a detecting device. Additional detecting devices (not referenced) may be used in accordance with one or more embodiments. A set of relationships are determined based on signal strengths of wireless signals received by device J and device K. The wireless signals may be received from various locations (e.g., location 1, location 2, and location 3) and various transmitting devices (device A and device B). Table 4 illustrates the previously determined set of relationships:

TABLE 4

| Relationship | Transmitting Location | Transmitting Device | Device J (Signal Strength) | Device K (Signal Strength) |
|---|---|---|---|---|
| R4 | L4 | T4 (Mobile Device) | J4 | K4 = J4 + 10 |
| R5 | L5 | Various | J5 | K5 = J5 − 20 |
| R6 | T6's location (actual location not known) | T6 (Stationary Device) | J6 | K6 = J6 + 15 |

In each relationship (R4-R6) illustrated in Table 4, signal strengths for wireless signal(s) received by device J are indicated relative to signal strengths for wireless signal(s) received by device K from the same (known or unknown) transmitting location. L4 and L5 are known locations. T4 is a mobile device. T6 is a stationary device.

The relationship R4 corresponds to signal strengths of wireless signals received by devices J and K from a first transmitting device T4 while being located at location L4. Specifically, device J received wireless signals with a signal strength J4 that is 10 dB lower than a signal strength K4 of wireless signals received by device K.

The relationship R5 corresponds to signal strengths of wireless signals received by devices J and K from a various transmitting devices while being located at a particular location L5. Specifically, device J received wireless signals with a signal strength J5 that is 20 dB higher than a signal strength K5 of wireless signals received by device K.

The relationship R6 corresponds to signal strengths of wireless signals received by devices J and K from a third transmitting device T6 with an unknown, but fixed/stationary location. Specifically, device J received wireless signals with a signal strength J6 that is 15 dB lower than a signal strength K6 of wireless signals received by device K.

Subsequent to determining relationships R4-R6, device K ("detecting device") detects a wireless signal transmitted by a particular transmitting device. The signal strength of the wireless signal, as received by device K, is −50 dB. Based on the signal strength of −50 dB, a signal strength is to be estimated for a wireless signal as if received by device J. Specifically, one of the relationships R4-R6 are to be selected and applied for estimating the signal strength.

If a location of the transmitting device is determined to be L4, then relationship R4 (K4=J4+10) is selected. Applying R4 to a K4 value of −50 dB to solve for J4 results in estimating signal strength of a wireless signal, as if received by device J, at −60 dB.

If a location of the transmitting device is determined to be L5, then relationship R5 (K5=J5−20) is selected. Applying R5 to a K5 value of −50 dB to solve for J5 results in estimating signal strength of a wireless signal, as if received by device J, at −30 dB.

If the transmitting device is identified as T6 (a stationary device), then relationship R6 (K6=J6+15) is selected. Applying R6 to a K6 value of −50 dB to solve for J6 results in estimating signal strength of a wireless signal, as if received by device J, at −65 dB.

Returning to FIG. 2A, in an embodiment, a device is optionally configured based on an estimated signal strength at a target wireless device (Operation 214). The target wireless device, detecting wireless devices, transmitting devices, and/or other devices may be configured.

In one example, a channel is configured for a wireless device based on an estimated signal strength values. Initially, relationships are determined between signal strengths of wireless signals received by a first access point on a first channel and wireless signals received by a second access point on the first channel from the same location. Subsequent to determining the relationships, the first access point is operating on a second channel. Interference is detected on a first channel by a second access point. Based on the level of interference detected by the second access point on the first channel, a level of interference is estimated for the first access point if the first access point was on the first channel. Based at least on the estimated level of interference, a determination is made as to whether the first access point should switch from the second channel to the first channel.

In another example, a channel is selected for a wireless device based on estimated signal strength values. Initially, a first access point is operating on a first channel. A client device, operating on a second channel, transmits a wireless signal. The wireless signal is detected by a second access point operating on the second channel. Based on a signal strength of the wireless signal, as detected by the second point, a signal strength is estimated for the wireless signal, as if detected by the first access point. The estimated signal strength is determined to be above a particular threshold. The estimated signal strength being above the particular threshold indicates that a good connection may be established between the first access point and the client device on the second channel. The first access point is configured to switch to the second channel in order to provide network access to the client device on the second channel. The second access point is configured to reject any connection requests from the client device.

Other examples of device configurations include, but are not limited to, selecting a transmit cell size and/or receive cell size, selecting transmit power, selecting receive sensitivity, making a load balancing decision, and/or determining a distance from another wireless device. For example, a signal strength of a noise signal at a target device is estimated, and a noise floor setting of the target device is adjusted based on the estimation. As another example, an estimated signal strength at an access point is lower than a threshold signal strength value, indicating a distance between the access point and the transmitting device is above a distance threshold. A new access point is added to the wireless environment to serve as a closer access point to the transmitting device.

D. Determine Estimated Channel Utilization for a Target Wireless Device

Figure 2B:
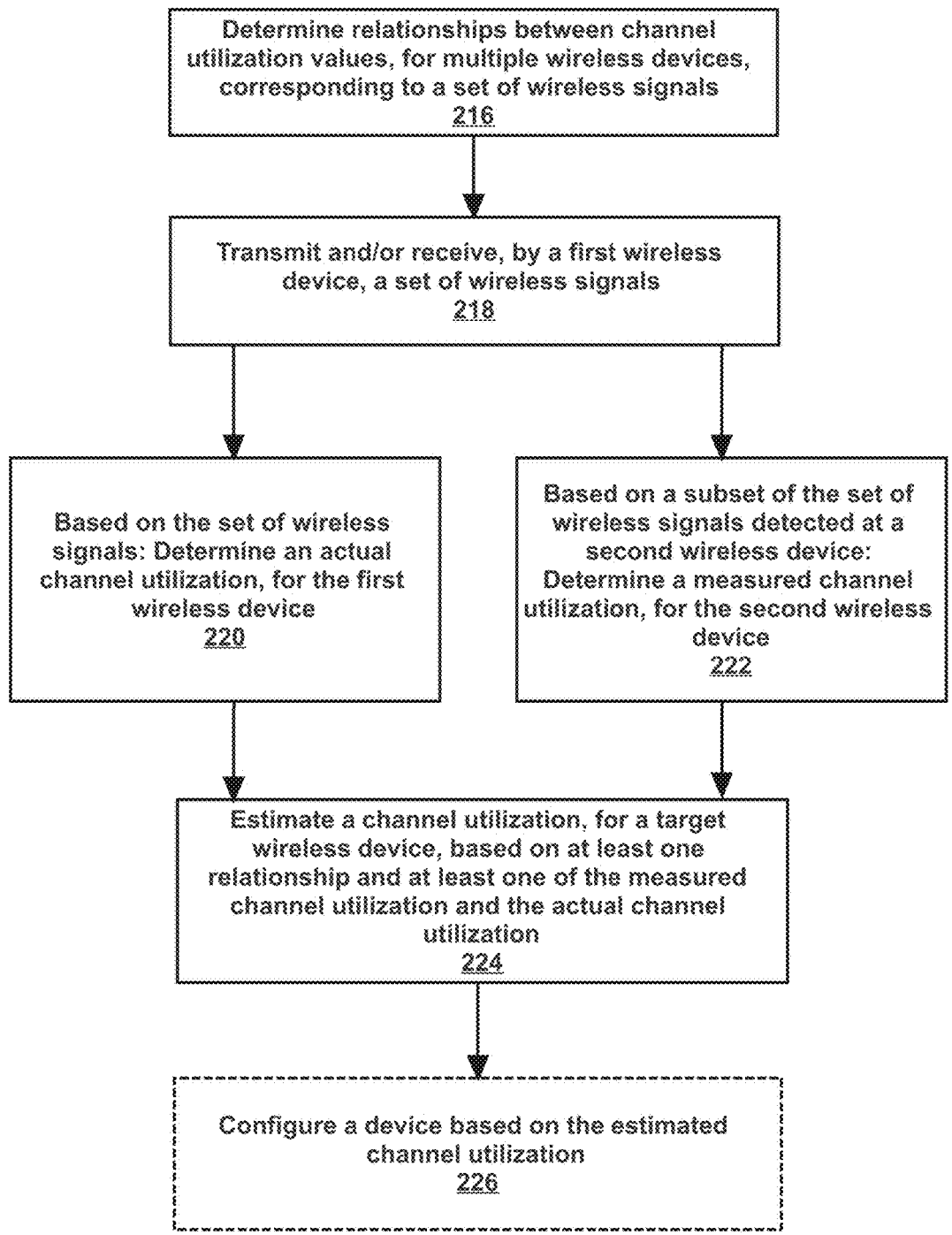
FIG. 2B shows an example set of operations for estimating channel utilization in accordance with one or more embodiments.

FIG. 2B illustrates an example set of operations for estimating channel utilization in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments. A first time period corresponds to a time period associated with the transmission/receipt of the wireless signals used for determining a relationship. A second time period corresponds to a time period associated with transmission/receipt of wireless signals used for estimating a channel utilization for a target wireless device.

Initially, one or more relationships between multiple wireless devices are determined based on channel utilization values, in accordance with one or more embodiments (Operation 216). In an embodiment, a relationship is determined based on two or more measured channel utilization values, of a particular channel, obtained during a first time period. In an example, a first wireless device transmits and/or receives a set of one or more wireless signals in a particular channel. Each of the set of wireless signals includes a header indicating that the wireless signal is being transmitted or received by the first wireless device. A second wireless device receives a first subset of the set of wireless signals. At least one of the received wireless signals is decoded to determine that the first subset of the wireless signals are being transmitted and/or received by the first wireless device. A percentage of time in which the first subset of the set of wireless signals is being received by the second wireless device is determined. This percentage of time is a first measured channel utilization value of the particular channel, for the second wireless device, corresponding to the set of wireless signals transmitted and/or received by the first wireless device.

Continuing the example above, a third wireless device receives a second subset of the set of wireless signals. At least one of the received wireless signals is decoded to determine that the second subset of the wireless signals are being transmitted and/or received by the first wireless device. A percentage of time in which the second subset of the set of wireless signals is being received by the third wireless device is determined. This percentage of time is a second measured channel utilization value of the particular channel, for the third wireless device, corresponding to the set of wireless signals transmitted and/or received by the first wireless device.

Continuing the example above, a mathematical, logical, or other functional relationship is determined between the first measured channel utilization value and the second measured channel utilization value. The first measured channel utilization C1 may be expressed as a function of the second measured channel utilization value C2, such that C1=f(C2). C2 is referred to herein as an input to the relationship. This relationship is a relationship between the second wireless device and the third wireless device, corresponding to wireless signals transmitted and/or received, on the particular channel, by the first wireless device. There may be multiple different relationships between the second wireless device and the third wireless device, corresponding to wireless signals transmitted and/or received by other different wireless device.

In another example, a first wireless device transmits and/or receives a set of one or more wireless signals in a particular channel. A first measured channel utilization value, for a second wireless device, corresponding to the set of wireless signals transmitted and/or received by the first wireless device, is determined. A second measured channel utilization value, for a third wireless device, corresponding to the set of wireless signals transmitted and/or received by the first wireless device, is determined. A third measured channel utilization value, for a fourth wireless device, corresponding to the set of wireless signals transmitted and/or received by the first wireless device, is determined. A mathematical, logical, or other functional relationship is determined between the first measured channel utilization value, the second measured channel utilization value, and the third measured channel utilization value. In an example, the first measured channel utilization C1 is expressed as a function of the second measured channel utilization value C2 and the third measured channel utilization value, such that C1=f(C2, C3).

In an embodiment, a relationship is determined based on at least one measured channel utilization value and at least one actual channel utilization value obtained during a first time period. In an example, a first wireless device transmits and/or receives a set of one or more wireless signals in a particular channel. Each of the set of wireless signals includes a header indicating that the wireless signal is being transmitted or received by the first wireless device. A percentage of time in which the set of wireless signals is being transmitted and/or received by the first wireless device is determined. This percentage of time is an actual channel utilization value of the particular channel, for the first wireless device, corresponding to the set of wireless signals transmitted and/or received by the first wireless device. A second wireless device receives a subset of the set of wireless signals. At least one of the received wireless signals is decoded to determine that the subset of the wireless signals are being transmitted and/or received by the first wireless device. A percentage of time in which the subset of the set of wireless signals is being received by the second wireless device is determined. This percentage of time is a measured channel utilization value of the particular channel, for the second wireless device, corresponding to the set of wireless signals transmitted and/or received by the first wireless device.

Continuing the example above, a mathematical, logical, or other functional relationship is determined between the actual channel utilization value and the measured channel utilization value. In an example, the measured channel utilization CM is expressed as a function of the actual channel utilization value CA, such that CM=f(CA). CA is referred to herein as an input to the relationship. This relationship is a relationship between the first wireless device and the second wireless device, corresponding to wireless signals transmitted and/or received, on the particular channel, by the first wireless device. Another relationship may be determined based on a measured channel utilization, for the second wireless device, and an actual channel utilization, for a third wireless device.

In another example, a first wireless device transmits and/or receives a set of one or more wireless signals in a particular channel. An actual channel utilization value, for the first wireless device, corresponding to the set of wireless signals transmitted and/or received by the first wireless device, is determined. A first measured channel utilization value, for a second wireless device, corresponding to the set of wireless signals transmitted and/or received by the first wireless device, is determined. A second measured channel utilization value, for a third wireless device, corresponding to the set of wireless signals transmitted and/or received by the first wireless device, is determined. A mathematical, logical, or other functional relationship is determined between the actual channel utilization value, the first measured channel utilization value, and the second measured channel utilization value. In an example, the first measured channel utilization C1 is expressed as a function of the second measured channel utilization value C2 and the actual channel utilization value CM, such that C1=f(C2, CM).

In an embodiment, a relationship is further associated with additional information, such as, a Modulation and Coding Scheme (MCS) value. In an example, a first wireless device transmits and/or receives a set of one or more wireless signals in a particular channel. Each of the set of wireless signals includes a header indicating that the wireless signal is (a) being transmitted or received by the first wireless device, and (b) being transmitted or received at a first MCS value. A second wireless device receives a first subset of the set of wireless signals. At least one of the received wireless signals is decoded to determine that the first subset of the wireless signals are (a) being transmitted and/or received by the first wireless device and (b) being transmitted and/or received at the first MCS value. A first measured channel utilization value, for the second wireless device, corresponding to the set of wireless signals transmitted and/or received by the first wireless device, is determined. A third wireless device receives a second subset of the set of wireless signals. At least one of the received wireless signals is decoded to determine that the second subset of the wireless signals are being transmitted and/or received by the first wireless device. A second measured channel utilization value, for the third wireless device, corresponding to the set of wireless signals transmitted and/or received by the first wireless device, is determined. A mathematical, logical, or other functional relationship is determined between the first measured channel utilization value and the second measured channel utilization value. This relationship is a relationship between the second wireless device and the third wireless device, corresponding to wireless signals transmitted and/or received by the first wireless device. This relationship is further associated with the first MCS value.

In an example, there may be multiple different relationships between a same group of wireless devices, corresponding to wireless signals transmitted and/or received by a first wireless device, for different MCS values, as indicated in Table 5 below. Wireless signals are transmitted and/or received at MCS1 by device X. An actual channel utilization X1, for device X, and a measured channel utilization Y1, for device Y, are determined. X1 is 20% more than Y1, such that Y1=X1−20%. This relationship is stored as R1 and is associated with MCS1. Subsequently, wireless signals are transmitted and/or received at MCS2 by device X. An actual channel utilization X2, for device X, and a measured channel utilization Y2, for device Y, are determined. X2 is 25% more than Y2, such that Y2=X2−25%. This relationship is stored as R2 and is associated with MCS2.

TABLE 5

| Relationship | Attributes | Actual Channel Utilization @ X | Measured Channel Utilization @ Y |
|---|---|---|---|
| R1 | MCS1 | X1 | Y1 = X1 − 20% |
| R2 | MCS2 | X2 | Y2 = X2 − 25% |

In an embodiment, a relationship between measured channel utilization values, for a second wireless device and a third wireless device, is further associated with an actual channel utilization value, for a first wireless device. In an example, a first wireless device transmits and/or receives a set of one or more wireless signals in a particular channel. An actual channel utilization, for the first wireless device, corresponding to the set of wireless signals transmitted and/or received by the first wireless device, is determined. A first measured channel utilization value, for the second wireless device, corresponding to the set of wireless signals transmitted and/or received by the first wireless device, is determined. A second measured channel utilization value, for the third wireless device, corresponding to the set of wireless signals transmitted and/or received by the first wireless device, is determined. A mathematical, logical, or other functional relationship is determined between the first measured channel utilization and the second measured channel utilization. This relationship is a relationship between the second wireless device and the third wireless device, corresponding to wireless signals transmitted and/or received by the first wireless device. This relationship is further associated with the actual channel utilization value, for the first wireless device. There may be multiple different relationships between the second wireless device and the third wireless device, corresponding to wireless signals transmitted and/or received by a first wireless device, for different actual channel utilization values.

In an embodiment, a relationship between a second wireless and a third wireless device is further associated with a signal strength of a wireless signal as received at the second wireless device. In an example, a first wireless device transmits and/or receives a set of one or more wireless signals in a particular channel. A second wireless device receives a first subset of the set of wireless signals. At least one signal strength of one of the received wireless signals is determined. A first measured channel utilization value, for the second wireless device, corresponding to the set of wireless signals transmitted and/or received by the first wireless device, is determined. A second measured channel utilization value, for the third wireless device, corresponding to the set of wireless signals transmitted and/or received by the first wireless device, is determined. A mathematical, logical, or other functional relationship is determined between the first measured channel utilization value and the second measured channel utilization value. This relationship is a relationship between the second wireless device and the third wireless device, corresponding to wireless signals transmitted and/or received by the first wireless device. This relationship is further associated with the signal strength value of one of the wireless signals received by the second wireless device. There may be multiple different relationships between the second wireless device and the third wireless device, corresponding to wireless signals transmitted and/or received by a first wireless device, for different signal strength values.

In an embodiment, a relationship between a channel utilization and a detected signal strength is determined. In an example, a first wireless device transmits and/or receives a set of one or more wireless signals in a particular channel. A second wireless device receives a first subset of the set of wireless signals. At least one signal strength of one of the received wireless signals is determined. A measured channel utilization value of the particular channel, for the second wireless device, corresponding to the set of wireless signals transmitted and/or received by the first wireless device, is determined. A mathematical, logical, or other functional relationship is determined between the detected signal strength and the measured channel utilization value. In an example, the measured channel utilization C is expressed as a function of the signal strength, such that C=f(S). S is referred to herein as an input to the relationship. There may be multiple different relationships between a signal strength and a channel utilization for the second wireless device, corresponding to wireless signals transmitted and/or received by other different wireless device.

In one or more embodiments, a first wireless device transmits and/or receives a set of one or more wireless signals during a second time period (Operation 218). Each of the set of wireless signals may include a header. The header may indicate that the wireless signal is being transmitted or received by the first wireless device. The header may also indicate that the wireless signal is being transmitted or received at a particular MCS value.

In one or more embodiments, an actual channel utilization value is determined (Operation 220), a measured channel utilization value is determined (Operation 222), and/or other information is determined. The measured channel utilization value, the actual channel utilization value, and the other information, correspond to the set of wireless signals transmitted and/or received by the first wireless device at Operation 218.

In an embodiment, an actual channel utilization value, for the first wireless device, is determined (Operation 220). A percentage of time in which the set of wireless signals are being transmitted and/or received by the first wireless device is determined. This percentage of time is an actual channel utilization value, for the first wireless device, corresponding to the set of wireless signals transmitted and/or received by the first wireless device.

In an embodiment, a measured channel utilization value, for a detecting wireless device, is determined (Operation 222). The detecting wireless device receives a subset of the set wireless signals transmitted and/or received by the first wireless device. At least one of the received wireless signals is decoded to determine that the subset of the wireless signals are being transmitted and/or received by the first wireless device. A percentage of time in which the subset of the set of wireless signals is being received by the detecting wireless device is determined. This percentage of time is a measured channel utilization value, for the detecting wireless device, corresponding to the set of wireless signals transmitted and/or received by the first wireless device.

In an embodiment, information related to the set of wireless signals transmitted and/or received by the first wireless device at Operation 118, other than channel utilization, is determined. In an example, signal strengths of one or more wireless signals as received by a second wireless device is determined. The one or more wireless signals are a subset of the set of wireless signals transmitted and/or received by the first wireless device.

In one or more embodiments, an estimated channel utilization is determined based on a relationship and at least one of a measured channel utilization and an actual channel utilization (Operation 224). A relationship applicable to the estimation is selected from a set of available relationships. The relationship is selected based on (a) an actual channel utilization, corresponding to a set of wireless signals transmitted and/or received by a first wireless device, determined at Operation 220 and/or a measured channel utilization, corresponding to the set of wireless signals, determined at Operation 222, (b) the identities of the detecting wireless device(s), the target wireless device, and the wireless device that is transmitting/receiving the set of wireless signals, and/or (c) any additional information related to the set of wireless signals.

In an embodiment, a relationship is selected from a set of available relationships based on the type(s) of information determined at Operations 220-222. The types of inputs, and corresponding channels, for each of the set of available relationships are identified. The information determined at Operations 220-222 are compared to the inputs. If the information determined at Operations 220-222 include the inputs of a particular relationship, then a match is found, and the particular relationship may be selected. In an example, an actual channel utilization of a first channel is determined at Operation 220. Then a relationship that takes an actual channel utilization of the first channel as an input may be selected. In another example, an actual channel utilization of a first channel is determined at Operation 220, and a measured channel utilization of the first channel is determined at Operation 222. Then a first relationship that takes an actual channel utilization of the first channel as an input may be selected. Alternatively, a second relationship that takes a measured channel utilization of the first channel as an input may be selected. Alternatively, a third relationship that takes an actual channel utilization and a measured channel utilization of the first channel as inputs may be selected. In another example, a signal strength of one or more wireless signals as received by a second wireless device is determined. Then a relationship that takes a signal strength as an input may be selected.

In an embodiment, a relationship is selected based on the identities of the detecting wireless device(s), the target wireless device, and the wireless device that is transmitting/receiving the set of wireless signals. The detecting wireless device(s), the target wireless device, and the wireless device that is transmitting/receiving the set of wireless signals are compared to the wireless devices associated with the set of available relationships. If a match with a wireless device associated with a particular relationship is found, then the particular relationship may be selected. In an example, an actual channel utilization, for Device A, is determined at Operation 220. An estimated channel utilization is desired for Device B. One of the set of available relationships associated with an actual channel utilization for Device A and a measured channel utilization for Device B. Then this relationship may be selected. In another example, a measured channel utilization, for Device C, corresponding to wireless signals transmitted and/or received by Device A, is determined at Operation 222. An estimated channel utilization, for Device B, corresponding to wireless signals transmitted and/or received by Device A, is desired. One of the set of available relationships is associated with a measured channel utilization for Device C, corresponding to wireless signals transmitted and/or received by Device A, and a measured channel utilization for Device B, corresponding to wireless signals transmitted and/or received by Device A. Then this relationship may be selected.

In an embodiment, a relationship is selected based on additional information related to the set of wireless signals transmitted and/or received by a first wireless device. Examples of additional information include a MCS value, an actual channel utilization value, and/or a received signal strength. Attributes associated with the set of available relationships are identified. The additional information is compared with the attributes. If the additional information is within a particular range of the attributes of a particular relationship, then a match is found, and the particular relationship may be selected. In an example, an actual channel utilization and/or a measured channel utilization, corresponding to a set of wireless signals transmitted and/or received by a first wireless device, is determined. A first MCS value corresponding the set of wireless signals is determined. One of the set of available relationships is associated with the first MCS value. Then this relationship may be selected. In another example, a measured channel utilization, for a detecting wireless device, corresponding to a set of wireless signals transmitted and/or received by a first wireless device, is determined. A first MCS value corresponding the set of wireless signals is determined. A first signal strength of one of the wireless signals detected by the detecting wireless device is determined. One of the set of available relationships is associated with the first MCS value and a second signal strength. A particular range for determining a match between signal strengths may be 5 dB. The first signal strength may be within 5 dB of the second signal strength. Then the relationship associated with the first MCS value and the second signal strength may be selected.

In one or more embodiments, after the applicable relationship is selected, the measured channel utilization and/or actual channel utilization determined at Operations 220-222 is applied to the applicable relationship, in order to obtain an estimated channel utilization. In an example, the applicable relationship indicates that a measured channel utilization C1, for a target wireless device, is 10% less than a measured channel utilization C2, for a detecting wireless device, that is, C1=C2−10%. A measured channel utilization, for the detecting wireless device, determined at Operation 222, is 50%. Then, the estimated channel utilization, for the target wireless device, is determined to be 50%−10%=40%.

In an embodiment, two or more relationships may be successively applied, in order to determine an estimation. In an example, an estimated channel utilization, for a second wireless device, corresponding to a set of wireless signals transmitted and/or received by a first wireless device, is desired. A first relationship estimates the channel utilization, for the second wireless device, as a function of a measured channel utilization, for a third wireless device. However, the third wireless device is unable to determine the measured channel utilization, for the third wireless device. The third wireless device may receive a subset of the set of wireless signals at a signal strength that is too low for the third wireless device to decode the wireless signals. Since the third wireless device is unable to decode the wireless signals, the third wireless device is unable to determine that the wireless signals are transmitted and/or received by the first wireless device. Thus the measured channel utilization, for the third wireless device, corresponding to the set of wireless signals, cannot be determined.

Continuing the above example, an estimated channel utilization, for the third wireless device, corresponding to the set of wireless signals, may be determined. A second relationship estimates a measured channel utilization, for the third wireless device, as a function of a detected signal strength of a wireless signal received at the third wireless device. The third wireless device receives a subset of the set of wireless signals. The third wireless device determines signal strengths of the received wireless signals. These signal strengths are applied to the second relationship, in order to determine an estimated channel utilization, for the third wireless device, corresponding to the set of wireless signals transmitted and/or received by the first wireless device.

Continuing the above example, an estimated channel utilization, for the second wireless device may be determined based on the estimated channel utilization, for the third wireless device. The estimated channel utilization, for the third wireless device, is applied to the first relationship, in order to determine an estimated channel utilization, for the second wireless device. The second relationship and the first relationship have been successively applied to estimate a channel utilization, for the second wireless device, corresponding to the set of wireless signals transmitted and/or received by the first wireless device.

In one or more embodiments, a device is optionally configured based on an estimated channel utilization, for a target wireless device (Operation 226). The target wireless device, detecting wireless devices, and/or other devices may be configured.

In one example, a channel is selected for a wireless device based on an estimated channel utilization value. A target wireless device is operating in Channel 1. An actual channel utilization of Channel 1, for the target wireless device, is 20%. A measured channel utilization of Channel 1, for the target wireless device, corresponding to wireless signals transmitted and/or received by a first wireless device, is 40%. A total channel utilization of Channel 1 is equal to the sum of the actual channel utilization, 20%, and the measured channel utilization, 40%, that is, 20%+40%=60%. Meanwhile, a measured channel utilization of Channel 6, for a detecting wireless device, corresponding to wireless signals transmitted and/or received by a second wireless device, is 10%. One of a set of available relationships is a relationship that estimates a channel utilization value C1 of Channel 6, for the target wireless device, as a function of a measured channel utilization C2 of Channel 6, for the detecting wireless device, such that C1=f(C2)=C2-4%. The measured channel utilization of Channel 6, for the detecting wireless device, 10%, is applied to the relationship. The estimated channel utilization of Channel 6, for the target wireless device, is determined to be 10%-4%=6%. The target wireless device determines that the estimated channel utilization of Channel 6 is lower than the total channel utilization of Channel 1. In order to operate in a channel with a lower channel utilization, the target wireless device may switch from Channel 1 to Channel 6.

Other examples of device configurations include, but are not limited to, selecting a transmit cell size and/or receive cell size, selecting transmit power, selecting receive sensitivity, making a load balancing decision, and/or determining a distance from another wireless device, as described above with respect to Operation 214 of FIG. 2A.

E. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims. Features, components, and/or operations described with regard to this example embodiment are not necessarily applicable to other embodiments.

Figure 3A:
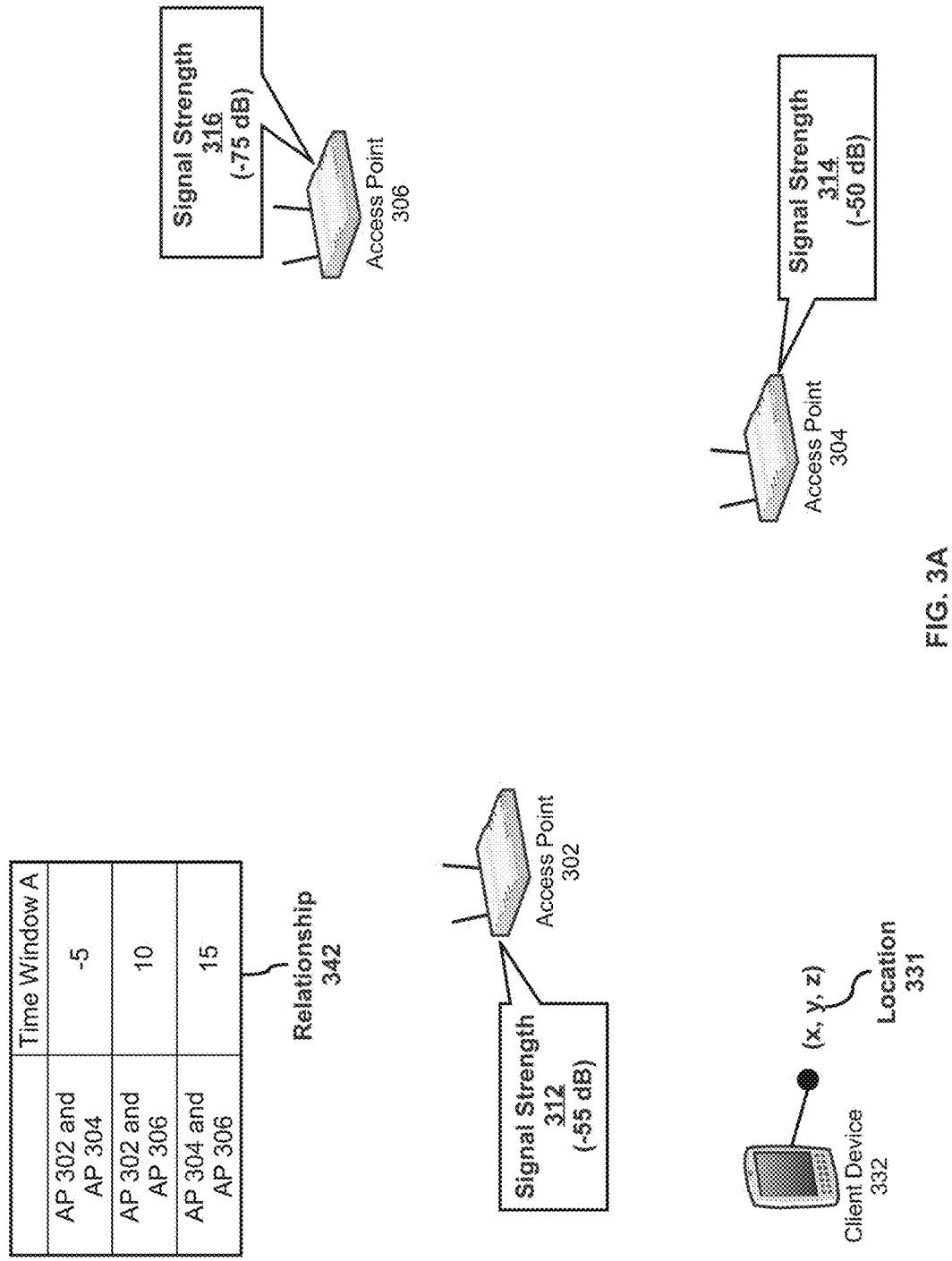
FIGS. 3A-3B illustrate an example of estimating signal strength in accordance with one or more embodiments.
Figure 3B:
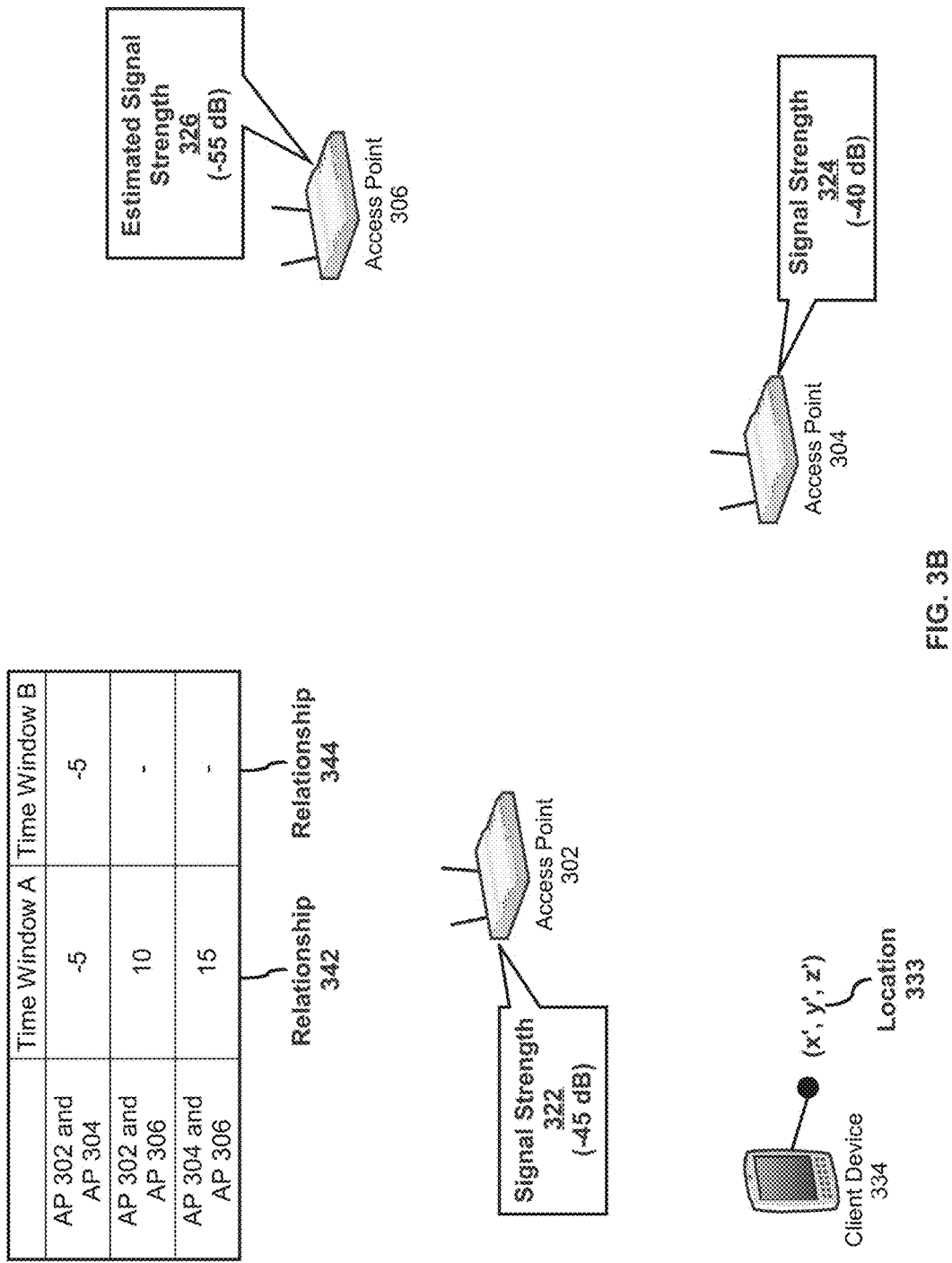

FIGS. 3A-3B illustrate an example of estimating signal strength in accordance with one or more embodiments. FIG. 3A illustrates a state of devices at a first time window ("Time Window A") and FIG. 3B illustrates a state of devices at a second, latter, time window ("Time Window B"). In this example embodiment, at Time Window A, client device 332, located at Location 331 with coordinates (x, y, z), transmits a first wireless signal in a first channel. Access point 302 receives the first wireless signal at a signal strength of −55 dB, access point 304 receives at −50 dB, and access point 306 receives at −75 dB. A relationship 342 is computed, including three differences. A first difference between access points 302 and 304 is −5, a second difference between access points 302 and 306 is 10, and a third difference between access points 304 and 306 is 15. Relationship 342 is stored as a table.

At Time Window B, client device 334, located at Location 333 with coordinates (x', y', z'), transmits a second wireless signal in the first channel. Client device 332 and client device 334 may be the same or different devices. Location 333 may be the same as or within a close proximity of location 331. Access points 302 and 304 are still operating in the first channel, but access point 306 has changed to a different channel. An estimate of a signal strength of the second signal as if received by access point 306 is desired. Access point 302 receives the second wireless signal at a signal strength of −45 dB, and access point 304 receives at −40 dB. A current relationship 344 is computed between access points 302 and 304, which is a difference of −5. The difference between access points 302 and 304 in relationship 344 matches the difference between access points 302 and 304 in relationship 342 (both are −5). Therefore, relationship 342 is selected for use in determining an estimation.

The selected relationship 342 is applied to the detected signal strength at access point 302. Relationship 342 indicates a difference of 10 between access points 302 and 306. This difference is subtracted from the detected signal strength at access point 302, which is −45 dB. Accordingly, a signal strength of the second wireless signal, as if received at access point 306, is −55 dB.

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
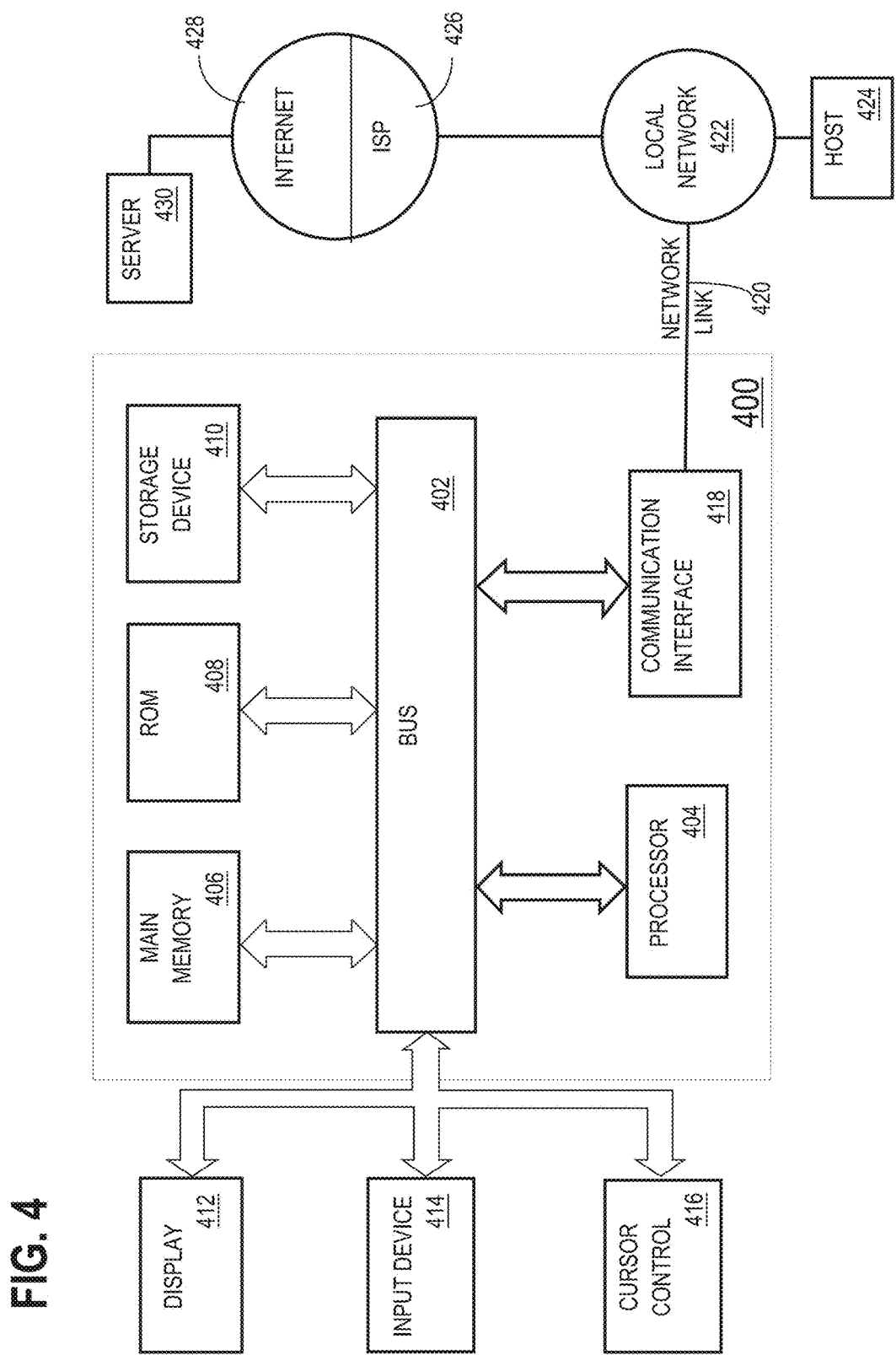
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   determining a first signal strength for at least a first wireless signal as received at a first wireless device;
   determining a second signal strength for at least the first wireless signal as received at a second wireless device;
   based on at least the first signal strength for at least the first wireless signal as received at the first wireless device and the second signal strength for at least the first wireless signal as received at the second wireless device:
   determining a relationship between (a) a signal strength for at least a particular wireless signal as received at the first wireless device and (b) a signal strength for at least the particular wireless signal as received at the second wireless device, wherein the relationship specifies the signal strength for at least the particular wireless signal as received at the second wireless device as a function of at least the signal strength for at least the particular wireless signal as received at the first wireless device;
   determining a third signal strength for a second wireless signal as received at the first wireless device;
   based on the relationship, applying the third signal strength for the second wireless signal as received at the first wireless device to the function to estimate a fourth signal strength for the second wireless signal as if received at the second wireless device;
   estimating the fourth signal strength for the second wireless signal as if received at the second wireless device, wherein estimating the fourth signal strength comprises determining an estimated value for the fourth signal strength.

2. The medium of claim 1, wherein the relationship indicates a difference value between the first signal strength and the second signal strength, and wherein the fourth signal strength is estimated by modifying the third signal strength by the difference value.

3. The medium of claim 1, wherein the first wireless signal and the second wireless signal are transmitted by a same transmitting device while located at a same transmitting location.

4. The medium of claim 1, wherein the fourth signal strength is estimated for the second wireless signal without any information related to a detection or receipt of the second wireless signal by the second wireless device.

5. The medium of claim 1, wherein the fourth signal strength is estimated for the second wireless signal without the second wireless signal actually being received by the second wireless device.

6. The medium of claim 1, wherein the operations further comprise configuring the second wireless device based on the fourth signal strength for the second wireless signal as if received at the second wireless device.

7. The medium of claim 1, wherein the operations further comprise configuring at least one device, other than the second wireless device, based on the fourth signal strength for the second wireless signal as if received at the second wireless device.

8. The medium of claim 1 wherein the first wireless device is a first access point and wherein the second wireless device is a second access point.

9. The medium of claim 8, wherein the operations further comprise selecting one of the second access point and a third access point for an association by a client device to obtain network access based on the fourth signal strength.

10. The medium of claim 1, wherein the relationship is determined based further on (a) a first plurality of signal strength values for a plurality of wireless signals as received at the first wireless device and (b) a second plurality of signal strength values for the plurality of wireless signals as received at the second wireless device.

11. The medium of claim 1, wherein:
   the relationship is determined between (a) the first signal strength, (b) the second signal strength, and (c) a fifth signal strength for at least the first wireless signal as received at a third wireless device; and
   the fourth signal strength is estimated based on the relationship, the third signal strength for the second wireless signal as received at the first wireless device, and a sixth signal strength for the second wireless signal as received by the third wireless device.

12. The medium of claim 11, wherein estimating the fourth signal strength comprises:
   determining that (a) a first difference value between the third signal strength for the second wireless signal as received at the first wireless device and a sixth signal strength for the second wireless signal as received by the third wireless device matches (b) a second difference value between the first signal strength for the first wireless signal as received at the first wireless device and the fifth signal strength for the first wireless signal as received at the third wireless device; and
   responsive to determining that the first difference value matches the second difference value, estimating the fourth signal strength as a function of the third signal strength and/or a function of the sixth signal strength.

13. The medium of claim 11, wherein the first wireless signal and the second wireless signal are transmitted by different devices from a same geographical location.

14. The medium of claim 11, wherein the first wireless device, the second wireless device, and the third wireless device are access points.

15. The medium of claim 11, wherein a transmitting device that transmitted the second wireless signal is a client device.

16. A non-transitory computer readable medium comprising instructions which, when executed by one or more hardware processors, causes performance of operations comprising:
- determining a first set of one or more signal strengths for a first set of one or more wireless signals as received at a first wireless device;
- determining a second set of one or more signal strengths for a second set of one or more wireless signals as received at a second wireless device;
- based on at least the first set of signal strengths for the first set of wireless signals as received at the first wireless device and the second set of signal strengths for the second set of wireless signals as received at the second wireless device:
- determining a relationship between (a) a signal strength for a first wireless signal as received at the first wireless device and (b) a signal strength for a second wireless signal as received at a second wireless device, wherein the relationship specifies the signal strength for the second wireless signal as received at the second wireless device as a function of at least the signal strength for the first wireless signal as received at the first wireless device;
- determining a third signal strength for a third wireless signal as received at the first wireless device;
- based on the relationship, applying the third signal strength for the third wireless signal as received at the first wireless device to the function to estimate a fourth signal strength for the third wireless signal as if received at the second wireless device;
- estimating the fourth signal strength for the third wireless signal as if received at the second wireless device, wherein estimating the fourth signal strength comprises determining an estimated value for the fourth signal strength.

17. The medium of claim 16, wherein the first set of wireless signals overlaps with the second set of wireless signals.

18. The medium of claim 16, wherein the first set of wireless signals is mutually exclusive of the second set of wireless signals.

19. The medium of claim 16, wherein at least one of the first set of wireless signals and at least one of the second set of wireless signals are transmitted within a predetermined time period of each other.

20. A non-transitory computer readable medium comprising instructions which, when executed by one or more hardware processors, causes performance of operations comprising:
- determining a first set of signal strength values corresponding to a first set of one or more signals received by a first wireless device from a transmitting device;
- determining a second set of signal strength values corresponding to a second set of one or more signals received by a second wireless device from the transmitting device;
- determining a relationship between the first set of signal strength values and the second set of signal strength values;
- wherein the first set of signals and the second set of signals are received within a same time window by the first wireless device and the second wireless device, respectively;
- wherein the relationship specifies the second set of signal strength values as a function of the first set of signal strength values;
- determining a third set of one or more signal strength values for a third set of one or more signals received by the first wireless device from the transmitting device;
- based on the relationship, applying the third set of signal strength values for the third set of signals received by the first wireless device from the transmitting device to the function to estimate a fourth set of one or more signal strength values for a fourth set of one or more signals (a) as if transmitted by the transmitting device and (b) as if received by the second wireless device;
- estimating the fourth set of one or more signal strength values for the fourth set of one or more signals (a) as if transmitted by the transmitting device and (b) as if received by the second wireless device, wherein estimating the fourth set of signal strength values comprises determining one or more estimated values for the fourth set of signal strength values.

21. The medium of claim 20, wherein the third set of signals and the fourth set of signals include a same particular wireless signal.

* * * * *